June 27, 1972  S. B. SPENCER  3,673,027
METHOD OF FORMING COATED FIBERS
Filed May 4, 1970
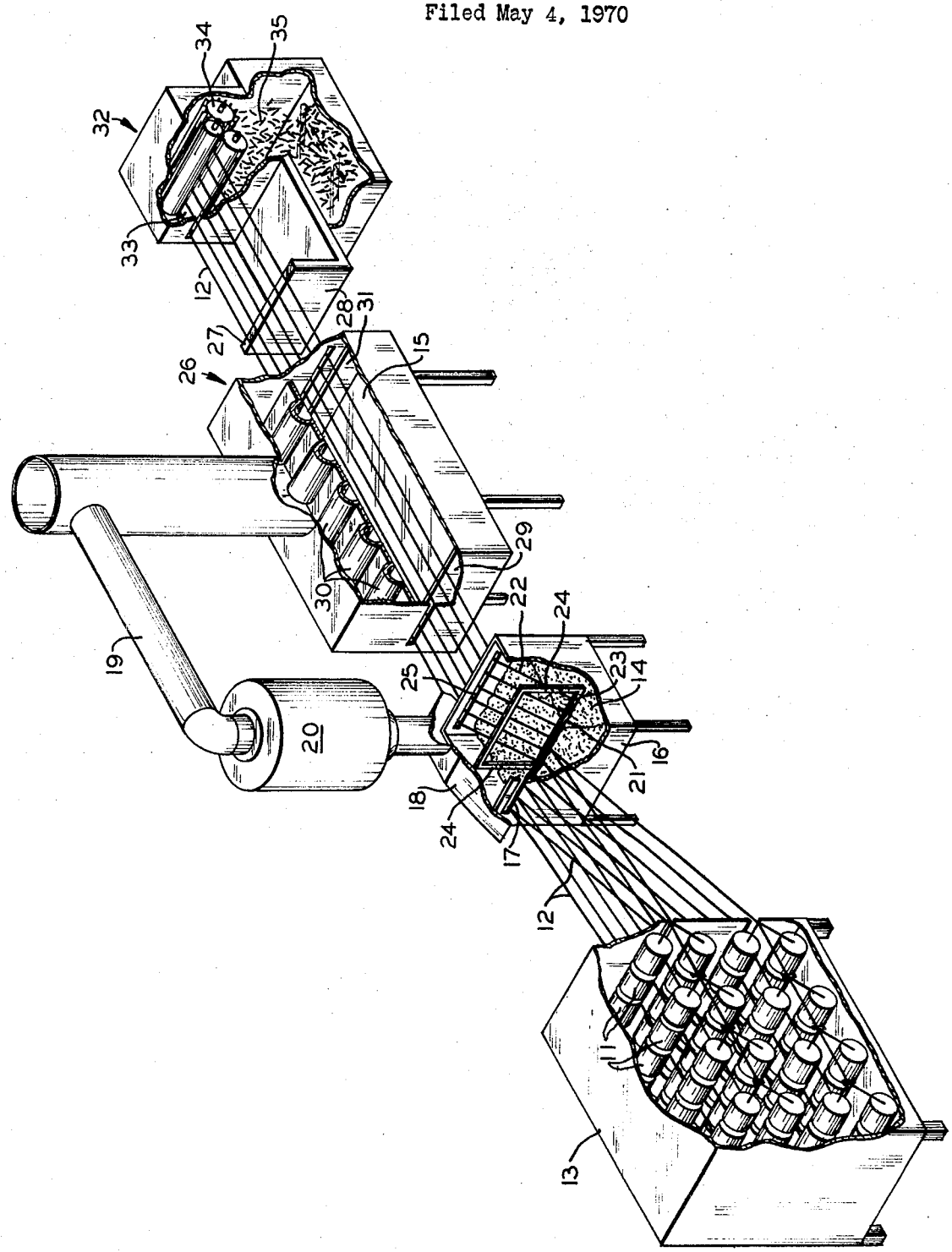
INVENTOR.
SAMUEL BINFORD SPENCER
BY
ATTORNEY

United States Patent Office 3,673,027
Patented June 27, 1972

3,673,027
METHOD OF FORMING COATED FIBERS
Samuel Binford Spencer, Perrysburg, Ohio, assignor to Johns-Manville Corporation, New York, N.Y.
Filed May 4, 1970, Ser. No. 34,152
Int. Cl. D02g 3/40
U.S. Cl. 156—167        9 Claims

ABSTRACT OF THE DISCLOSURE

A strand is made up of a large number of continuous filaments bonded together by a plastic coating, and is particularly suited for chopped strand employed in a matrix of plastic compatible with the coating where the coating binds the filaments when divided into short strand lengths.

Strand is drawn under tension over a surface to separate the filaments and is passed through a mass of finely divided particles of the coating plastic. Particles adhere to and are carried with the strand into a heated region where the softening temperature of the plastic is reached. The plastic flows and coalesces to form a binding coating on the cooled strand which retains its integrity when chopped or otherwise severed into short lengths.

BACKGROUND OF THE INVENTION

Grouped continuous filaments have long been used as strands in the textile and plastic reinforcement art. In the past, large numbers of such filaments have been drawn simultaneously from bushings coated with a dressing, gathered into a strand and wound for future utilization. The dressing has been in various forms, and of various compositions depending upon the characteristics to be imparted to the strand. Typically, the dressing can be an aqueous fluid as applied. It can contain a lubricant to minimize abrasion between filaments of the strand and between adjacent strands. A coupling agent is commonly applied to enhance the bond between the strand and the matrix which the strand reinforces when used for reinforcement. Frequently, the filaments require bonding to maintain strand integrity during subsequent handling and therefore in the case of glass filaments a film former such as polyvinyl acetate or starch is employed as a binder. Such bonding is particularly desirable where the strand is cut into lengths, usually less than one inch long. Under certain circumstances it is desirable to avoid filamentation of the chopped strand prior to incorporation into the plastic matrix it is to reinforce.

The purpose of short fiber lengths is to reinforce the matrix in which they are dispersed. This reinforcement requires a bond between the fibers and resin matrix which does not deteriorate. In the case of glass fibers a coupling agent has conventionally been employed to improve the adhesion of resins or plastics to the surface of the glass fibers. Silane compounds are frequently employed. The filaments of chopped strands have been held together by polyvinyl acetate or other film formers for mixing with molding resins such as unreinforced plastic pellets or flake resin for molding compounds.

However, when the plastic of the matrix is of certain compositions the coupling agent effects are diminished by the presence of the film former in that the resultant products fail to exhibit the mechanical strengths expected from consideration of specimens prepared without the film former under laboratory conditions. Further, discoloration of the products occurs due to thermal degradation during molding of certain constituents of the dressings including the film former. In many cases the film formers provide only limited structural integrity of the chopped strand such that optimum handling techniques cannot be utilized thereon, particularly where chopped strand is handled in bulk in pneumatic or vacuum conveying systems.

This invention eliminates the degradation of the fiber to matrix bond by the film former by producing a filament bonding coating on the strand which has a polymer composition the same as or compatible with the matrix material to be reinforced.

An object of the invention is to improve the bond between strands of filament and the matrix material which the strands reinforce.

Another object is to avoid discoloration of matrix material reinforced by glass filaments.

A further object is to increase the mechanical strengths and heat resistance of general purpose polymers reinforced with strands of filament.

A fourth object is to enable chopped strand made up of large numbers of filaments to be handled as an intermediate product without filamentizing.

A feature of the invention according to the above objects resides in coating a strand of continuous filaments which have no previously applied film former with a material which is compatible with the matrix material in which the strand is to be incorporated.

A second feature involves applying the coating as defined above in a finely divided form by passing the filament through a mass of the finely divided material. The application can be enhanced by fluidizing the finely divided material in its zone of application as by a flow of fluid such as air and in some instances vibration.

A third feature is to enhance the pickup of particles of coating material by carrying the strand under tension across a surface which tends to separate the filaments while they are in the mass of coating material whereby the particles tend to lodge between the filaments.

A fourth feature is to subject the coated strand to a treatment which softens the particles so that they tend to coalesce into a coating on the strand binding the filaments together.

A further feature is to chop the strand into discrete reinforcing lengths.

DESCRIPTION OF THE DRAWING

The drawing is a schematic perspective representation of apparatus for processing a plurality of strands of continuous filament fibers for incorporation in a plastic matrix as chopped strand reinforcement.

DETAILED DESCRIPTION OF A PREFERRED EMBODIMENT

While the present invention lends itself to the improvement of strands made up of a plurality of filaments of many forms, it is particularly advantageously applicable to siliceous materials such as continuous glass filaments. Such filaments are derived from various ingredients mixed to a specified formulation, for example that disclosed in D. Labino U.S. Pat. 3,053,672, issued Sept. 11, 1962 and entitled Glass Composition, by mechanically attenuating streams or filaments of molten to soft glass flowing or drawn from orifices in a glass melting furnace. Usually, the furnace orifices are in an element termed a bushing containing a large number of closely spaced orifices. The filaments emanating from these orifices are coated with a dressing and gathered into a strand. In the preferred embodiment, the strand is made up of multiples of two hundred and four filament ends although this number is not critical.

Dressings applied to strands as thus produced vary with the ultimate utilization of the strands. In many instances they include a coupling agent to enhance the bond of the fiber to the matrix which the fiber is to reinforce. In some instances they include film formers to bond the filaments into strand form. Where the strand is to be chopped or otherwise severed into lengths of the order of an inch or less long, it is particularly important to provide a binder to retain strand integrity and avoid filamentation.

According to this invention conventional film formers such as polyvinyl acetate and other binder materials which might interfere with the fiber-to-matrix bond are not incorporated in the derssing. An advantageous dressing for the strand is a water emulsion of a silane coupling agent such as amino-propyltrimethoxy silane and a lubricant such as pelargonic acid amide solubilized with acetic acid in water. Such a strand has poor integrity and will readily filamentize when chopped, however, it can be wound on a spool to form a cake 11 of conventional form for further processing.

The dressed strand is coated with a material which is compatible with the plastic of the matrix to be reinforced thereby. In the case of glass fiber strand for reinforcing polyolefin polymers such as polypropylene and polyethylene, the coating applied to the fibers can be polypropylene. The amount of coating depends upon the degree of binding of the filaments required. About 30% by weight of polypropylene to glass has been found advantageous as a coating for many usages such as for blending with flakes or pellets of polypropylene or high density polyethylene as injection molding compounds.

Coating of the fibers to bind the strand filaments together can be accomplished as illustrated in the drawing. A multiplicity of strands 12 are stored as cakes 11 in creel 13 and are drawn from the creel as parallel runs through a mass 14 of finely divided dry coating material from which they pick up particles which are coalesced into coatings as they pass through a hot zone 15 which raises the temperature of the coating particles at least to their softening point. While the number of strands processed can vary, commercial production can be achieved with 180 strands each having 816 filament ends processed simultaneously. One means of exposing the strands 12 to the mass 14 of coating particles is to maintain the mass 14 as a fluidized bed of dry particles of a powder form by passing a gas such as air through a porous bottom (not shown) in a container 16 so that it flows upward through the bed 14. This can be augmented, particularly where cavitation tends to occur in the powder bed with vibration of the container 16.

The degree of pickup of particles from bed 14 is an inverse function of the amount of silane on the strand, a direct function of the tension imposed on the strand, an inverse function of the linear speed of advance of the strand through the bed and a direct function of the length of the run of exposure of each portion of the strand to the bed. The silane coupling agent makes a low molecular weight polymer having some binding effect between filaments of the strand. In passing the strand to the bed it is carried through a guide eye 17 having a smooth surface which is generated on a radius so large with respect to the radius defining the circumference of the strand cross section as to present an essentially flat surface tangent to the strand cross section. The strand is bent over the guide eye 17 while subjected to back tension so that the silane polymer is fractured and the cross section flattened whereby the filaments are spread as they enter the bed. The particles of the bed are entrained in the moving strand by the silane on the filaments and by mechanical entrapment between the spread filaments. Thus, as the tension on the strand over the guide eye 17 is increased the filaments of the strand tend to conform to the guide eye surface over a broader expanse and to be spread to a greater degree so that they present more area to the bed for picking up coating particles.

In practice, fluidizing air for the powder bed 14 is confined by a hood 18 communicating with an exhaust duct system 19 which can include an integral exhaust fan 20. The silane coupling agent can be present in amounts of the order of a few tenths percent by weight of the glass strand, quantities of 0.13% and 0.25% being typical. Residence time of the strand in the fluidized powder bed of polypropylene can be of the order of 0.2 second where the path in the bed is about six inches long and the speed advance of the strand is 150 f.p.m. (feet per minute). However, speeds up to 1000 f.p.m. have been employed successfully. The strand has been withdrawn from the cake 11 in various cross-sections ranging from circular to ribbon form. Its back tension has been developed by a system of offset guides (not shown) where two offset eyes will provide about 2 or 3 grams of back tension. Polypropylene particles of an average 200 micron size have been picked up by the strand in a range of from 20.4% to 37.8% of the total coated fiber weight at speeds of 1170 f.p.m. to 102 f.p.m. respectively when applied to strands of 816 filaments of E glass in continuous filaments of 0.00052 inch average diameter coated with 0.13% by weight silane.

Pickup of the particles for coating and binding the strand can also be controlled by the amount of residence of the strand in the powder bed. Under given conditions of tension and a given amount of silane coupling agent applied to the strand pickup of particles from bed 14 will drop about 20% in increasing the speed from 100 feet per minute to 600 feet per minute.

The path through the bed 14 is dictated by strand guides. In the illustration two runs 21 and 22 are employed in the bed. Run 21 extends from entry guide eye 17 to guide eyes 23 maintained immersed in bed 14 by support rods 24. Run 22 extends from guide eyes 23 to exit guide eye 25. The form of the strand bearing surface of each of eyes 17, 23 and 25 can be as described for eye 17 or it can be other relatively flat surfaces over which the filaments are spread by the tension imposed on the strand.

Entrained particles of the coating material are coalesced by heating them to their softening temperature. In the case of polypropylene, this is about 330° F. This causes the loosely held powder particles embedded within and adhered to the strand to flow together and form a continuous film on the glass strand. An infrared oven 26 has been employed for this purpose where the strand is suspended as a catenary between exit guide eye 25 and a guide 27 beyond a cooling zone 28 where the coating is cooled to a solid film. It should be noted that the heating and cooling of the material of the particles is accomplished with a minimum of contact and manipulation of the strand subsequent to its exit from the bed 14. This avoids loss of coating particles and the pickup of the softened material of the particles by contacting surfaces. Further, the heating should be limited in time so that the resin is exposed to temperatures above its melting point for only a few seconds and thermal degradation of the polymer is avoided or minimized.

The heat treatment of the powder coating involves passing the strand through an inlet baffle 29 to oven 26 without contacting that baffle and subjecting the strand to heat from resistance heaters 30 above its path. A reflective surface can be provided below the strand to improve heat transfer and its spacing relative thereto adjusted. In one embodiment the oven is about 16 feet long and has been set to maintain a temperature of 600° F. while the strand is advanced at 150 f.p.m. The strand thus has an oven residence time of about 6.4 seconds between input baffle 29 and a similar exit baffle 31. At these speeds the polypropylene is at or above its melting temperature of about 330° F. for about the final two seconds in the oven and can be cooled to a hardened film in ambient air in about one foot of travel from exit baffle 31. Of course, the temperatures, rates and distances can be adjusted by alternative heat transfer means including a blower for cooling air in cooling zone 28.

In some utilizations a compaction of the strand to a close bundle of filaments or the formation of a cross-section in the strand other than that natural assumed as the catenary cools to harden the coating is desirable. This is accomplished by passing the strand over one or a series of forming surfaces which can be controlled as to temperature to control the conformation of the strand and its surface. Such forming surfaces can be dies, wiping bars (particularly where the strand is desired in a ribbon form), or rollers (none of which are shown).

In the illustrative process, the strand is utilized as chopped strand in lengths of an inch or less and advantageously about one-quarter inch lengths. Such strand is cooled to solidify the coating in ambient air with strand travel of about 150 f.p.m. in a distance of about one foot from the oven exit and accordingly a strand guide 27 is provided at that point without picking up any coating material from the strand. Further cooling of the strand to a temperature of 120° F. or less is desirable to avoid any tendency for the strand or coating to stick to elements of chopper 32. Chopper 32 provides the pulling force to carry the strand through the apparatus by means of its feed rools 33 carrying the strand to its chopping means 34. Chopped strand 35 issues from chopper 32 as a stable commercial product suitable for shipment to compounders of molding compounds.

The reinforcement of matrix polymers by blending chopped strand coated with a polymer of similar composition with the non-reinforced matrix polymer results is a substantial improvement in physical properties of the molded product. These improvement are illustrated in the following table based upon samples made up from compounds having commercial dressings on the reinforced chopped strand (polyvinyl acetate film former) previously available and samples made from the compound reinforced with the coated chopped strand according to this invention each molded on a reciprocating screw injection molding machine to form the finished reinforced composite. In the case of the compound reinforced with the coated chopped strand of the invention, the molded parts had excellent fiber dispersion throughout, improved surface characteristics, minimal or no discoloration of the base resin as well as the improved mechanical properties.

In the case of a matrix resin of polypropylene flake and a glass fiber strand in a fiber content of 30% by weight where the only difference is the presence of the film former polyvinyl acetate and the absence of the polypropylene coating of the new strand in the standard strand reinforcement and while the new strand contained no polyvinyl acetate film former and was coated with 30% by weight of polypropylene results were as follows:

| Fiber type | Tensile strength (p.s.i.) | Flexure strength (p.s.i.) | Flexure modulus (p.s.i.×10⁵) | Impact strength (ft.-lb./in.) |
|---|---|---|---|---|
| New | 12,000 | 16,500 | 7.6 | 4.1 |
| Std | 8,700 | 12,000 | 8.8 | 3.9 |

The same reinforcing in matrices of high density polyethylene flake offered the following:

| Fiber type | Tensile strength (p.s.i.) | Flexure strength (p.s.i.) | Flexure modulus (p.s.i.×10⁵) | Impact strength (ft.-lb/in) |
|---|---|---|---|---|
| New | 10,700 | 14,200 | 6.2 | 2.4 |
| Std | 8,800 | 8,800 | 6.3 | 1.8 |

It is to be appreciated that the present strand combination and the process of applying coatings and further processing the coated strand is not limited to the above detailed disclosure. Rather, the coating process can be applied to strands made up of filaments of materials other than glass and can involve coating materials other than polyolefin polymers provided they can be softened or liquidified from a finely divided coating state to form a continuous coating without destroying the fiber. End products other than coated, chopped strand can be produced utilizing the present concepts. Accordingly, the above disclosure is to be read as illustrative and not in a limiting sense.

What is claimed is:

1. The process of forming a strand comprising the steps of drawing a plurality of glass filaments from a molten supply of glass simultaneously; coating the filaments with a dressing free of film former and including a coupling agent and a lubricant, gathering the coated filaments into a strand, drying the dressing on the strand to establish strand integrity, drawing the dried strand under tension over a surface which is broad and flat relative to the cross-sectional form of the strand whereby the dressing tends to rupture and the filaments of the strand tend to be displaced to a flatter cross-section and thereby separate, coating the filaments with dry particles of a finely divided thermoplastic resin by passing the separated filaments through a dry mass of finely divided resin, passing the coated filaments from the mass of resin, heating the coated filaments above the softening temperature of the thermoplastic resin, and maintaining said filaments in a strand while they are cooled from the softening temperature of the thermoplastic resin.

2. The process according to claim 1 wherein the finely divided particles are applied as a fluidized powder.

3. The process according to claim 2 including agitating the powder mass to fluidize the powder and introduce it to the intersticies of the strand between the filaments thereof.

4. The process according to claim 3 wherein gas is passed through the powder mass to facilitate fluidization.

5. The process according to claim 1 wherein the amount of resin which is adhered to the strand when it is removed from the mass is a direct function of the tension imposed on the strand as it is drawn over the surface.

6. The process according to claim 1 wherein amount of resin which is adhered to the strand when it is removed from the mass is an inverse function of the lineal speed with which the strand is passed through the mass.

7. The process according to claim 1 wherein said heated strand is drawn over a forming surface to shape said strand.

8. The process according to claim 1 including the step of chopping the cooled resin coated strand.

9. The process according to claim 1 including the step of severing the cooled strand transverse of its longitudinal axis into a plurality of short lengths.

References Cited

UNITED STATES PATENTS

| | | | |
|---|---|---|---|
| 3,022,210 | 2/1962 | Phillipps | 156—180 |
| 3,511,697 | 5/1970 | Auken et al. | 117—126 GR |
| 3,192,089 | 6/1965 | Clark | 156—180 |
| 3,197,324 | 7/1965 | Brooks | 117—Dig. 6 |
| 3,119,718 | 1/1964 | Bradt | 117—126 GR |
| 2,730,455 | 1/1956 | Swann | 117—126 GR |
| 3,318,746 | 5/1967 | Langlois | 117—33 |
| 3,472,729 | 10/1969 | Sterman et al. | 117—126 GS |

ROBERT F. BURNETT, Primary Examiner

L. KOECKERT, Assistant Examiner

U.S. Cl. X.R.

117—7, 26, 33, 76 T, 126 GR, Dig. 6; 156—180; 161—176